United States Patent
Coleman et al.

(10) Patent No.: US 7,629,008 B2
(45) Date of Patent: Dec. 8, 2009

(54) LOW-CALORIE WHOLE GRAIN CEREAL BAR

(75) Inventors: Edward C. Coleman, New Fairfield, CT (US); Abigail H. Schmid, Guttenberg, NJ (US); Meagan C. Katz, Chestnut Ridge, NY (US); Sharon Birney, Yorktown Heights, NY (US)

(73) Assignee: Kraft Foods Global Brands LLC, Northfield, IL (US)

( * ) Notice: Subject to any disclaimer, the term of this patent is extended or adjusted under 35 U.S.C. 154(b) by 660 days.

(21) Appl. No.: 11/268,045

(22) Filed: Nov. 7, 2005

(65) Prior Publication Data

US 2007/0104853 A1 May 10, 2007

(51) Int. Cl.
*A23L 1/10* (2006.01)

(52) U.S. Cl. .................. 426/96; 426/103; 426/618; 426/621; 426/648; 426/656; 426/804

(58) Field of Classification Search .............. 426/96, 426/103, 618, 621, 648, 658, 659, 656, 804
See application file for complete search history.

(56) References Cited

U.S. PATENT DOCUMENTS

| 4,673,578 | A | * | 6/1987 | Becker et al. | ............... | 426/93 |
| 4,871,557 | A | * | 10/1989 | Linscott | ............... | 426/93 |
| 5,612,074 | A | * | 3/1997 | Leach | ............... | 426/74 |
| 6,827,955 | B2 | | 12/2004 | McCabe | | |
| 6,830,766 | B2 | | 12/2004 | McCabe | | |
| 2008/0057169 | A1 | * | 3/2008 | Archibald et al. | ........... | 426/410 |

FOREIGN PATENT DOCUMENTS

| WO | 01/64044 | * | 7/2001 |
| WO | 01/64044 | A2 | 9/2001 |

* cited by examiner

*Primary Examiner*—Helen F Pratt
(74) *Attorney, Agent, or Firm*—Fitch, Even, Tabin & Flannery

(57) ABSTRACT

A low-calorie whole grain cereal bars is provided that includes whole grain and binder in amounts effective for providing a cereal bar with at least about 15 weight % or more whole grain, at least about 5 weight % or more protein, about 5 weight % or more fiber, and at least 120 or less calories per 28 gram bar. The cereal bars are low in calories but still provide a good source of whole grain and fiber while maintaining an acceptable taste and organoleptic properties.

26 Claims, No Drawings

LOW-CALORIE WHOLE GRAIN CEREAL BAR

The present invention relates to low-calorie whole grain cereal bars. More specifically, the cereal bars include whole grain and binder in amounts effective for providing a cereal bar with at least about 15 weight % or more whole grain, at least about 5 weight % or more protein, about 5 weight % or more fiber, and at least 120 or less calories per 28 gram bar. The cereal bars of the present invention provide low calorie nutritional value by providing whole grain, protein and fiber while maintaining good organoleptic properties.

BACKGROUND

Whole grains are a good source of fiber. Diets high in fiber have been associated with various health benefit such as lowering cholesterol, modulating blood sugar levels and reducing the risk of colon cancer. Whole grains also provide antioxidants, which are thought to be protective against cardiovascular disease and various cancers, Convenience food products which contain high levels of whole grain and total dietary fiber are difficult to manufacture because the dietary fiber tends to absorb high amounts of moisture during processing. As a result, products containing high levels of dietary fiber become dry and usually have poor texture and mouthfeel.

Hand-held cereal bars are well known in the art. These portable foods are consumed as a meal substitute or snack. These cereal bars ideally would provide nutritional value without sacrificing taste and flavor, as well as possess a reasonable shelf life during which the texture remains chewy without being sticky, hard, or crumbly. However, achieving a balance of low calories in combination with high level of whole grain and fiber and acceptable taste and organoleptic properties has been problematic to obtain in prior cereal bars.

SUMMARY

The cereal bars of the present invention provide nutritional value without sacrificing taste and flavor, as well as possess a reasonable shelf life during which the texture remains chewy without being sticky, hard, or crumbly. The cereal bars are low in calories but still provide a good source of whole grain and fiber while maintaining an acceptable taste and organoleptic properties. As such, the cereal bars of the present invention are portable, shelf life-stable foods that can be used as a meal substitute, supplement, or snack food.

The cereal bars of the present invention include a blend of whole grain, binder and a compound coating. The cereal bars overcome the poor texture, mouthfeel and dryness associated with know high fiber bars, in part, by providing the fiber source in at least two different components of the cereal bar. In this aspect, fiber is provided by the whole grain, in the binder and optionally in the compound coating. The cereal bar includes at least about 6 weight % soluble fiber and at least about 3.5 weight % insoluble fiber.

The present invention is directed to a cereal bar that includes at least about 15 weight % whole grain, preferably about 20 to about 60 weight % whole grain, more preferably about 20 to about 40 weight % whole grain, and most preferably about 25 to about 30 weight % whole grain, and a binder. The cereal bar is effective for providing at least 5 weight % or more protein, preferably about 8 to about 12 weight % protein, about 5 weight % or more fiber, preferably about 8 to about 10 weight % fiber, and at least 120 or less calories per 28 gram bar, preferably about 100 calories or less per 28 gram bar. The cereal bar has an Aw (water activity) of about 0.40 to about 0.60, preferably about 0.45 to about 0.55.

In one aspect, the cereal bar includes from about 20 to about 60 weight % whole grain. The whole grain includes whole grains from the group of oats, wheat, wheat flakes, barley, hulled barley flakes, sorghum, and corn. In an important aspect, the cereal bar may include rolled oats alone or a blend of rolled oats and another whole grain. In this aspect, the whole grain component of the cereal bar is a blend of at least about 5 weight % rolled oats, preferably about 5 to about 15 weight %, at least about 4 weight % wheat flakes, preferably about 5 to about 15 weight %, and at least about 5 weight % hulled barley flakes, preferably about 5 to about 15 weight %, all based on the total weight of the cereal bar.

The cereal bar further includes from about 35 to about 60 weight % binder, preferably about 45 weight %. The binder may include carbohydrate compositions selected from the group consisting of cane juice, brown rice syrup, caramel, oligofructose, inulin and mixtures thereof. In an important aspect, the binder may be caramel alone or a blend of caramel and other carbohydrate compositions. In this aspect, the binder is a blend of at least about 1 weight % cane juice, preferably about 1 to about 15 weight % cane juice, about 5 to about 20 weight % brown rice syrup, preferably about 13 weight % brown rice syrup, about 20 to about 50 weight % caramel, preferably about 38 weight % caramel, and about 1 to about 5 weight % oligofructose or inulin, preferably about 2.5 weight % oligofructose or inulin. The binder provides from about 25 to about 35 weight % of the fiber in the cereal bar. The remaining fiber is provided by the whole grain component, and optionally by the compound coating.

The cereal bar further includes from about 5 to about 40 weight % compound coating. The compound coating may be blended with the binder, applied over the cereal bar by drizzling or enrobing, or both. In an important aspect, the cereal bar include about 10 to about 20 weight % compound coating, more preferably about 14 to about 16 weight % compound coating, all based on the total weight of the binder blend. The compound coatings are effective for enhancing flavor, preventing drying of the cereal bar, and for helping to maintain shelf-life.

The compound coating includes about 25 to about 55 weight % fat, preferably about 30 to about 32 weight % fat; about 30 to about 60 weight % carbohydrates; and at least one flavoring agent in an amount up to about 10 weight %, all based on the weight of the compound coating. The compound coating may include from about 0 to about 30 weight % fiber, preferably about 20 to about 30 weight % fiber.

In another aspect, a method is provided for making a cereal bar. In this aspect, a binder is blending with whole grain in amounts effective for providing a cereal bar having at least about 5 weight % or more protein about 5 weight % or more fiber and at least 120 or less calories per 28 grams and an Aw of about 0.4 to about 0.6. In one aspect, the compound coating and binder are blended and then combined with the whole grain. Alternatively, the compound coating and binder are blended and then combined with the whole grain and compound coating is contacted with a surface of the cereal bar. In another alternative, binder is blended with whole grain and compound coating is applied to a surface of the cereal bar.

DETAILED DESCRIPTION

Whole Grain

As used herein, "whole grain" refers to grains that contain all the essential parts and naturally-occurring nutrients of the entire grain seed such as the bran, germ and endosperm fractions. The bran (pericarp or hull) is the mature ovary wall which is beneath the cuticle, and comprises all the outer cell layers down to the seed coat. It is high in non-starch-polysaccharides, such as cellulose and pentosans. (A pentosan is a complex carbohydrate present in many plant tissues, particularly brans, characterized by hydrolysis to give five-carbon-atom monosaccharides (pentoses). It is any member of a group of pentose polysaccharides having the formula $(C_5H_8O_4)_n$, found in various foods and plant juices.) Because of its high fiber content, the bran or pericarp tends to be very tough.

The scutulum and the embryonic axis are the two major parts of the germ. The scutulum makes up 90% of the germ, and stores nutrients mobilized during germination. During this transformation, the embryonic axis grows into a seedling. The germ is characterized by its high fatty oil content. It is also rich in crude proteins, sugars, and ash constituents. The scutulum contains oil-rich parenchyma cells which have pitted cell walls.

The endosperm contains the starch, and is lower in protein content than the germ and the bran. It is also low in crude fat and ash constituents.

Examples of whole grain that may be utilized in the cereal bar include oats, wheat, wheat flakes, barley, hulled barley flakes, sorghum, and corn.

Binder

For purposes herein, a "binder" refers to a material that essentially acts as an "edible glue" for combining and holding together relatively dry ingredients as a self-supporting body. The binder may be a single component such as caramel, or prepared as a blend of carbohydrates and syrups. Useful carbohydrates and syrups include cane juice, brown rice syrup, caramel, oligofructose, and inulin. In an alternative aspect, the binder may also include compound coating.

Compound Coating

Compound coatings which are utilized serve several important functions. Most importantly, the compound coating effectively masks and reduces the fibrous mouthfeel ordinarily associated with dietary fiber, hence making the product more desirable to the consumer. The compound coating also functions as a processing aid which serves to facilitate extrusion of the fibrous product into bars. The compound coating is generally present from about 5 weight % to about 40 weight % of the product, preferably in the amounts of about 10 weight % to about 40 weight % of the product, and most preferably the compound coating is present in the amounts of about 15 to about 30 weight % of the product. The compound coating may contain a number of ingredients, but essential to its make-up are a fat portion, carbohydrates and flavoring. Thus, in one embodiment the compound coating includes:

(1) a fat portion in an amount of about 25% to about 55% by weight, preferably about 30% to about 32% by weight of the compound coating;

(2) a carbohydrate in an amount of about 30% to about 60% by weight of the compound coating; and (3) at least one flavoring agent in an amount up to about 10% by weight of the compound coating.

The fat portion of the compound coating may comprise a single fat or a combination of fats. The groups of fats which are useful are quite broad and are selected from the group consisting of fractionated fats, hydrogenated oils, partially hydrogenated oils, unsaturated oils and mixtures thereof. In general terms, domestic fats and oils, also known as to those skilled in the art as non-lauric ester containing fats, are useful as well as those known in lauric ester-containing fats and oils.

The term "fats" and "oils" are used by the applicant interchangeably, although there may be differences as understood by the skilled artisan. "Fats" is generally a term to refer to the solid embodiment of the above-mentioned groups and "oils" refers to the liquid form. For purposes of this invention, the fat or mixtures of fats in the compound coating have a melting point of about 90° to about 110° F. to properly crystallize and hold the product shape subsequent to extrusion and cooling. More specifically, as a subclass of these, the fat portion of the compound coating is selected from the group consisting of coconut oil, palm oil, palm kernel oil, cottonseed oil, safflower oil, sunflower oil, soy oil, corn oil and mixtures thereof. In an important aspect, the fat is provided from palm kernel oil.

Another important ingredient included in the compound coating are carbohydrates which act primarily as sweetening agents. Although the amount of sweetener may be varied within the broad ranges of about 30% to about 60% by weight of the compound coating, it is preferred that the sweetener be a granulated sugar present in the range of about 40% to about 50% by weight of the compound coating. The carbohydrate or sweetener must be sufficient in physical make-up to provide adequate bulk and texture to the compound coating. Those carbohydrates which provide sufficient bulk are the monosaccharides and dissacharides. The preferred sugar is sucrose. Minor amounts of other monosaccharides and polysaccharides as well as sugar alcohols, polyhydric alcohols and artificial sweeteners may be useful to adjust the sweetness level.

Flavoring agents may be chosen from food ingredients which impart a flavor or by the direct addition of flavors abstracted from foods. For example, those foods which may be directly added for flavoring are selected from the general class of dried fruits and nuts. Dried peaches, apricots, orange rind and raisins are among those fruits readily employable.

Chocolate, peanut butter, yogurt, honey, and molasses are examples of flavoring agents which may be utilized. Other flavors which are useful in the present invention are selected from the class consisting of vanilla extract, vanillin, chocolate extract, almond extract, orange oil, lemon oil, apple essence, spearmint oil, raspberry essence, strawberry essence, cherry essence, pineapple essence, grape oil, lime oil, grapefruit oil and a combination thereof.

Emulsifiers, adjuvants and other well known confectionery additives may be added to the compound coating to adjust the viscosity, rheology or other physical or chemical property to desired levels. Lecithin is the preferred emulsifier. Mono- and diglycerides are also useful emulsifiers. Additives designed to cut the sweetness may also be added. For example, pulverized citric acid crystals may be added in small amounts for this purpose. The amounts of these additives are not critical to an understanding of the invention. Some source of compound coatings that may be utilized include Kerry Ingredients (Beloit, Wis.), Barry Callebaut (Quebec, CA) and Blommer Inc. (East Greenville, Pa.).

Water Activity

Excess moisture is undesirable for both the processing procedure and the finished product. Yet the final product must not be so dry as to give a perceptible fibrous mouthfeel. Thus, moisture content and balance is important. In this regard, the cereal bar has an Aw of about 0.40 to about 0.60, preferably about 0.45 to about 0.55. Higher water activities can result in the agglomerates, and hence the bar as a whole, becoming too soft and less chewy in texture and mouthfeel. Higher water activities are also undesirable due to migration problems occurring between discrete food components having higher water content to food components of lower water content within the product, leading to loss in texture and/or flavor. The present invention significantly inhibits, and in some cases effectively eliminates, this water migration problem. Higher water activities also may result in the need for addition of antimicrobials. The present invention provides good microbial stability without addition of antimicrobials. As used herein, free of antimicrobials means less than detectable levels of antimicrobials present in the cereal bar. Examples of antimicrobials include known food grade antimicrobials such as calcium propinonate, potassium sorbate, and sodium benzoate.

Fiber

The use of the term "fiber" is often used as a catchall for what has become known as the sum of crude fiber and dietary fiber. Crude fiber is generally understood to mean the residue left after boiling the food in dilute caustic and then in dilute acid. This method recovers about 50-80% of cellulose, about 10-50% of lignin and about 20% of hemicellulose. Generally, for purposes of the present invention the term "fiber" or "dietary fiber" is intended to mean any food which when ingested in a monogastric animal, especially a human, reaches the large intestine essentially unchanged. In essence, fiber is understood to mean those constituents derived from botanical materials which are resistant to human digestive enzymes.

Dietary fiber is more particularly defined as the sum of all polysaccharides and lignin that are not digested by the endogenous secretions of the human digestive tract. The polysaccharides are derived from either the plant cell-wall or cell-content. Those carbohydrates which are contained in the plant cell-wall include gums, mucilages, pectins, pectin substances, algal polysaccharides and hemicelluloses. All of these carbohydrate materials are classified as polysaccharides. Thus, for purposes of this invention, fiber and dietary fiber includes the above polysaccharides in addition to cellulose and lignin, individually or in combination, derived from one or more plant varieties or species. Although the term "fiber" commonly is used to refer to filamentous string-like materials, dietary fiber is generally gelatinous or mucilaginous in character.

The cereal bar provides a good source of dietary fiber. The dietary fiber is a combination of soluble and insoluble fiber. A significant source of soluble fiber is the binder, preferably from the caramel. The binder will provide about 25 to about 35 weight % of the soluble fiber in the cereal bar. Additional soluble fiber may be added as a powder. The majority of the insoluble fiber is provided from the whole grain. Remaining fiber is provided by the whole grain fiber and optionally by the compound coating.

Examples of total fiber and soluble fiber content of cereal bars is set forth below.

| Product Flavor | % total fiber | % soluble fiber | % insoluble fiber |
| --- | --- | --- | --- |
| Peanut Butter | 13.2 | 9.6 | 3.6 |
| Mixed Berry | 13.9 | 6.9 | 7.0 |
| Milk Chocolate | 11.4 | 7.8 | 3.6 |

Method of Making a Cereal Bar

As previously described, a process of making a snack food product comprising the steps of:

(1) mixing whole grain with a binder, or with a binder and compound coating;
(2) blending the mix of (1);
(3) extruding the resulting mixture into a sheet and cutting the sheet into desired size bars; and
(4) optionally drizzling or enrobing the cereal bar with the compound coating.

The invention will be further understood from the following examples which are intended to illustrate preferred embodiments and are not intended to limit the effective scope of the claims.

EXAMPLES

Example Formula

Peanut Butter with Chocolate Chips and Peanut Drizzle

| Ingredient | % |
| --- | --- |
| Binder | |
| Caramel w/Fiber | 17.5 |
| Peanut Butter Flavored Coating | 11.5 |
| Brown Rice Syrup | 6 |
| Maltitol Syrup | 5 |
| Evaporated Cane Juice Syrup | 2.5 |
| Natural and Artificial Flavors | 2 |
| Inulin | 1 |
| Salt | 0.4 |
| Anti-oxidants | 0.05 |
| Sucralose | 0.05 |
| Dries | |
| Extruded Multi-Grain Nugget | 11 |
| Rolled Oats | 10.5 |
| Barley Flakes | 10 |
| Wheat Flakes | 8.5 |
| Extruded Soy Protein Nugget (60% Protein) | 7 |
| Topping | |
| Peanut Butter Flavored Compound Coating | 4.5 |
| Milk Chocolate Flavored Confectionary Drop | 2.5 |
| TOTAL | 100 |

Aw = 0.48 to 0.51
Fiber = 25 to 35 weight %

Example Formula

Chocolate with Yogurt Flavored Chips and Chocolate Drizzle

| Ingredient | % |
| --- | --- |
| Binder | |
| Caramel w/Fiber | 17.0 |
| Chocolate Flavored Coating | 12.0 |
| Brown Rice Syrup | 6 |
| Maltitol Syrup | 5 |
| Evaporated Cane Juice Syrup | 1.5 |
| Natural and Artificial Flavors | 2 |
| Inulin | 1 |
| Chocolate Liquor | 1 |
| Salt | 0.4 |
| Anti-oxidants | 0.05 |
| Sucralose | 0.05 |
| Dries | |
| Extruded Multi-Grain Nugget | 11 |
| Rolled Oats | 10.5 |
| Barley Flakes | 10 |
| Wheat Flakes | 8.5 |
| Extruded Soy Protein Nugget (60% Protein) | 7 |

-continued

| Ingredient | % |
|---|---|
| Topping | |
| Chocolate Flavored Compound Coating | 4.5 |
| Yogurt Flavored Confectionary Drop | 2.5 |
| TOTAL | 100 |

Aw is 0.49 to 0.54
Fiber = 25 to 35 weight %

Example Formula

Mixed Berry with Yogurt Flavored Drizzle

| Ingredient | % |
|---|---|
| Binder | |
| Caramel w/Fiber | 17.0 |
| Yogurt Flavored Coating | 12.5 |
| Brown Rice Syrup | 6 |
| Maltitol Syrup | 5 |
| Natural and Artificial Flavors | 2 |
| Evaporated Cane Juice Syrup | 1 |
| Inulin | 1.5 |
| Salt | 0.2 |
| Citric Acid | 0.2 |
| Anti-oxidants | 0.05 |
| Sucralose | 0.05 |
| Dries | |
| Extruded Multi-Grain Nugget | 11 |
| Rolled Oats | 10.5 |
| Barley Flakes | 10 |
| Wheat Flakes | 4.5 |
| Extruded Soy Protein Nugget (60% Protein) | 7 |
| Infused Blueberries and Cranberries | 4.5 |
| Topping | |
| Yogurt Flavored Compound Coating | 7 |
| TOTAL | 100 |

Aw is 0.53 to 0.55
Fiber = 25 to 35 weight %

| Target Bar Dimensions | | | |
|---|---|---|---|
| Bar Weight | Bar Width | Bar Length | Bar Height |
| 28 grams | 1.000" | 3.40" | 0.75" |

Density = 0.70 ± 0.10 g/cc

Bar Process Description

1. Binder is prepared by blending syrups/liquids (i.e brown rice syrup, evaporated cane juice syrup, water and sucralose), warm caramel (80° F.), compound coating (100IF) and minor dry components (i.e. salt, anti-oxidants) in a high shear mixer with heating to attain a temperature of about 170-212° F.
2. Dry ingredients (i.e wheat flakes, oats, barley flakes) to a horizontal type mixer and mixed for approximately 1 minutes at 15 rpm. If rework (trim from bars prior to enrobing) is utilized, it is added at 5-10% before mixing of dry ingredients.
3. Binder from Step #1 is cooled to approximately 150-170° F. and flavors are added. The cooled binder is transferred to the cereal blend of Step #2 and mixed for approx. 2 to 3 minutes in a mixer at 15 rpm. Final temperature of cereal blend is 110-120° F.
4. Cereal mixture is then transferred to a Sollich Bar line used for making granola type products. Mixture is processed through a series of stainless steel jacketed rollers to yield a sheet of approx. ¾" in height. Cereal sheet is then cooled (35-55° F.) followed by slitting and guillotine cutting to yield final bar dimensions.
5. If a drizzle or surface coating is required, sized cereal bars are then pass through a Sollich-typed enrober or decorator followed by a final cooling step before packaging.

What is claimed is:

1. A cereal bar comprising:
   a cereal grain consisting essentially of a whole grain selected from the group consisting of oats, wheat, wheat flakes, barley, hulled barley flakes, sorghum, corn and mixtures thereof, the cereal grain comprising at least about 15 weight % or more of the cereal bar;
   about 35 weight % or more of a binder; and
   about 5 weight % or more of a coating compound;
   at least about 6 weight % of a soluble fiber; and
   at least about 3.5 weight % insoluble fiber, the soluble fiber and insoluble fiber being in amounts and in a ratio which are effective to inhibit water migration between the whole grain, binder and coating compound; and the whole grain, binder, coating compound, soluble fiber and insoluble fiber are effective to provide an Aw of about 0.4 to about 0.6, the cereal bar having at least about 5 weight % or more protein, and not more than 120 calories per 28 gram bar.

2. The cereal bar of claim 1 wherein the cereal bar has from about 20 to about 60 weight % whole grain.

3. The cereal bar of claim 2 wherein the cereal bar has from about 35 to about 60 weight % binder, from about 8 to about 14 weight percent total fiber, and about 5 to about 40 weight % coating compound, and wherein the binder comprises a carbohydrate composition selected from the group consisting of cane juice, brown rice syrup, caramel, oligofructose, inulin and mixtures thereof and wherein the fiber is at least in the whole grain and the binder.

4. The cereal bar of claim 2 wherein the whole grain is a blend of at least about 5 weight % rolled oats, at least about 4 weight % wheat flakes, and at least about 5 weight % hulled barley flakes.

5. The cereal bar of claim 2 wherein the cereal bar has from about 35 to about 60 weight % binder.

6. The cereal bar of claim 5 wherein the binder comprises a carbohydrate composition selected from the group consisting of cane juice, brown rice syrup, caramel, oligofructose, inulin and mixtures thereof.

7. The cereal bar of claim 6, wherein the binder is caramel.

8. The cereal bar of claim 5 wherein the cereal bar has about 5 to about 40 weight % coating compound.

9. The cereal bar of claim 5 wherein the coating compound comprises about 25 to about 55 weight % fat; about 30 to about 60 weight % carbohydrates; at least one flavoring agent; and from about 0 to about 30 weight % fiber.

10. The cereal bar of claim 6 wherein the binder is a blend of at least about 1 to about 15 weight % cane juice, about 5 to about 20 weight % brown rice syrup, about 20 to about 50 weight % caramel, and about 1 to about 5 weight % oligofructose or inulin.

11. The cereal bar of claim 1, wherein the fiber is provided in at least the whole grain and binder components.

12. A method for making a cereal bar comprising:
combining a cereal grain consisting essentially of a whole grain and a binder to provide a whole grain bound whole grain product, the whole grain selected from the group consisting of oats, wheat, wheat flakes, barley, hulled barley flakes, sorghum, corn and mixtures thereof; and
cutting the whole grain product to provide the cereal bar having at least about 5 weight % at least about 6% soluble fiber; and at least about 3.5 weight % insoluble fiber, not more than 120 calories per 28 grams, and an Aw of about 0.4 to about 0.6.

13. The method of claim 12 wherein the method further comprises combining the whole grain and the binder to provide a whole grain/binder blend, and then applying a coating compound to the whole grain/binder blend to provide a cereal bar with from about 20 to about 60 weight % whole grain, from about 35 to about 60 weight % binder, and from about 5 to about 40 weight % of the coating compound.

14. The method of claim 12 wherein the method further comprises blending the binder with a coating compound to provide a binder/coating compound blend and then combining the binder/coating compound blend with the whole grain to provide a cereal bar with from about 20 to about 60 weight % whole grain, from about 35 to about 60 weight % binder, and from about 5 to about 40 weight % of the coating compound.

15. The method of claim 13 wherein the binder is blended with whole grain and the coating compound is applied to a surface of the cereal bar.

16. The method of claim 12 wherein the whole grain is a blend of at least about 5 weight % rolled oats, at least about 4 weight % wheat flakes, and at least about 5 weight % hulled barley flakes.

17. The method of claim 16 wherein the binder is caramel.

18. The method of claim 12 wherein the binder comprises a carbohydrate composition selected from the group consisting of cane juice, brown rice syrup, caramel, oligofructose, inulin and mixtures thereof.

19. The method of claim 18 wherein the binder is a blend of at least about 1 to about 15 weight % cane juice, about 5 to about 20 weight % brown rice syrup, about 20 to about 50 weight % caramel, and about 1 to about 5 weight % oligofructose or inulin.

20. The method of claims 13 or 14 wherein the coating compound comprises about 25 to about 55 weight % fat; about 30 to about 60 weight % carbohydrates; at least one flavoring agent; and from about 0 to about 30 weight % fiber.

21. The method of claim 12 wherein the fiber is provided in at least the whole grain and binder components.

22. A cereal bar consisting essentially of:
from about 20 to about 60 weight % whole grain selected from the group consisting of oats, wheat, wheat flakes, barley, hulled barley flakes, sorghum, corn and mixtures thereof;
from about 35 to about 60 weight % binder; and
from about 5 to about 40 weight % coating compound;
at least about 6 weight % of a soluble fiber; and
at least about 3.5 weight % insoluble fiber, the cereal bar comprising from about 8 to about 14 weight percent total fiber, the soluble fiber and insoluble fiber being in amounts and in a ratio which are effective to inhibit water migration between the whole grain, binder and coating compound; and the whole grain, binder, coating compound, soluble fiber and insoluble fiber effective to provide the cereal bar with an Aw of about 0.4 to about 0.6, the cereal bar having at least about 5 weight % or more protein, and not more than 120 calories per 28 gram bar.

23. The cereal bar of claim 22 wherein the soluble fiber and insoluble fiber are in a ratio in the range of 2.7:1 soluble to insoluble fiber and the fiber is in at least the whole grain and the binder.

24. A method for making a cereal bar comprising:
combining a cereal grain consisting essentially of a whole grain, fiber, a binder and a coating compound to provide a coated cereal bar product, the whole grain selected from the group consisting of oats, wheat, wheat flakes, barley, hulled barley flakes, sorghum, corn and mixtures thereof; and
cutting the coated cereal bar product to provide the cereal bar, the cereal bar consisting essentially of from about 20 to about 60 weight % whole grain, from about 35 to about 60 weight % binder, and about 5 to about 40 weight % coating compound, the cereal bar having from about 8 to about 14 weight percent total fiber, at least about 5 weight % or more protein, not more than 120 calories per 28 grams, and an Aw of about 0.4 to about 0.6, the total fiber comprising at least about 6 weight % soluble fiber and at least about 3.5 weight % insoluble fiber.

25. The method of claim 24 wherein the binder comprises a carbohydrate composition selected from the group consisting of cane juice, brown rice syrup, caramel, oligofructose, inulin and mixtures thereof.

26. The method of claim 25 wherein the whole grain, the binder and the coating compound include fiber.

* * * * *

UNITED STATES PATENT AND TRADEMARK OFFICE
CERTIFICATE OF CORRECTION

PATENT NO.        : 7,629,008 B2                                                Page 1 of 1
APPLICATION NO.   : 11/268045
DATED             : December 8, 2009
INVENTOR(S)       : Edward C. Coleman et al.

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 660 days.

should read (*) Notice: Subject to any disclaimer, the term of this patent is extended or adjusted under 35 U.S.C. 154(b) by 872 days.

Column 9, approximately line 10, in claim 12, after "5 weight %" insert -- or more protein, --.

Signed and Sealed this

Eighteenth Day of May, 2010

David J. Kappos
*Director of the United States Patent and Trademark Office*